(12) United States Patent
Wenger

(10) Patent No.: US 12,398,543 B2
(45) Date of Patent: Aug. 26, 2025

(54) HOSE COUPLING FOR A HYDRANT, AND HYDRANT

(71) Applicant: VONROLL INFRATEC (INVESTMENT) AG, Emmenbrucke (CH)

(72) Inventor: Sascha Wenger, Oensingen (CH)

(73) Assignee: VONROLL INFRATEC (INVESTMENT) AG, Emmenbrucke (CH)

( * ) Notice: Subject to any disclaimer, the term of this patent is extended or adjusted under 35 U.S.C. 154(b) by 0 days.

(21) Appl. No.: 18/284,188

(22) PCT Filed: Jan. 11, 2022

(86) PCT No.: PCT/EP2022/050429
§ 371 (c)(1),
(2) Date: Sep. 26, 2023

(87) PCT Pub. No.: WO2022/207149
PCT Pub. Date: Oct. 6, 2022

(65) Prior Publication Data
US 2024/0167254 A1    May 23, 2024

(30) Foreign Application Priority Data

Mar. 29, 2021 (EP) .................................... 21165498

(51) Int. Cl.
*E03B 9/02* (2006.01)
*F16L 33/035* (2006.01)

(52) U.S. Cl.
CPC .............. *E03B 9/02* (2013.01); *F16L 33/035* (2013.01)

(58) Field of Classification Search
CPC ................................ E03B 9/02; F16L 33/035
See application file for complete search history.

(56) References Cited

U.S. PATENT DOCUMENTS

| 4,271,909 A | * | 6/1981 | Chatfield, Jr. | ......... A62C 31/22 175/170 |
| 4,303,093 A | * | 12/1981 | Swindler | ................. F16K 31/28 251/35 |
| 2019/0277433 A1 | * | 9/2019 | Kierath | .................... B29C 45/33 |
| 2024/0222120 A1 | * | 7/2024 | Zhou | .................... H01L 21/0337 |

FOREIGN PATENT DOCUMENTS

| DE | 20113917 U1 | 11/2001 |
| DE | 202012001005 U1 | 6/2012 |
| DE | 202012001007 U1 | 6/2012 |
| DE | 102015204182 A1 | 5/2016 |

OTHER PUBLICATIONS

International Search Report with Translation and Written Opinion for PCT application No. PCT/EP2022/050429, mailed Apr. 4, 2022.
International Application Status Report generated Sep. 21, 2023.

* cited by examiner

*Primary Examiner* — Michael R Reid
(74) *Attorney, Agent, or Firm* — Notaro, Michalos & Zaccaria P.C.

(57) ABSTRACT

A hose coupling for a hydrant has a ventilation device. The ventilation device has a non-return valve that is received in a receptacle incorporated into an outer flange of the hose coupling.

16 Claims, 4 Drawing Sheets

HOSE COUPLING FOR A HYDRANT, AND HYDRANT

The present invention relates to a hose coupling for a hydrant and to a hydrant having such a hose coupling.

Hydrants are connected to a water distribution system and represent a fitting for the withdrawal of water to enable the fire department but also public and private users to withdraw water from the public water distribution system. The mains pressure in the water distribution system is typically about 6 to 9 bar. In general, hydrants are distinguished between surface hydrants and underground hydrants. The above-ground hydrant is permanently installed above ground and has outlets into which couplings with, for example, claws can be screwed to make a bayonet connection with a counterpart on a fire hose. The underground hydrant is installed underground and covered by a ground cover from above. Thus, the underground hydrant is a water tapping point located below the level of the ground, which is closed by the ground cover.

Hydrants comprise a riser pipe with an interior space and an exterior, wherein the interior space opens into the connection for water withdrawal. To open and close hydrants, they are provided with a main valve comprising a main valve body and a sealing seat sealable to the main valve body. The main valve body is connected to one end of a spindle rod through which the main valve body can be moved axially up and down.

The arrangement of main valve body and sealing seat is located in the area of a bottom-side inlet pipe and thus below the so-called frost line. As long as the main valve body is in the closed position, the interior space of the riser pipe should be sealed against frost with respect to the hydrant inlet so that no freezing of water still in the interior space of the riser pipe occurs.

There are efforts to ensure that after the main valve has been shut off, any water still in the interior space of the riser pipe, also called residual water, is drained to the outside so that the interior space of the riser pipe is free of water that could otherwise freeze inside it. This is to prevent damage to the hydrant that could be caused by freezing water. Likewise, draining the water from the interior of the riser pipe can protect against corrosion in the interior of the hydrant as well as prevent nucleation from stagnant water.

Drainage systems are known which are provided in the region of the main valve body and can open a fluid line to the outside into the ground when the main valve body is in the closed position. Through this fluid line, the water (at a low point) can reach the outside and seep into the soil.

Hydrants are known whose hose couplings are each provided with a backflow preventer. These backflow preventers only open in the direction of the outflowing water and are otherwise closed. This prevents water from a fire hose, for example, from being forced back into the hydrant and possibly prevents foreign substances from entering the interior of the hydrant.

A disadvantage in the prior art is that the remaining water in the interior of the hydrant cannot be drained or discharged completely to the outside. One reason for this can be that the backflow preventer blocks an air supply to the inside of the hydrant when closed, so that an unfavorably high negative pressure can build up in the interior of the hydrant compared to the pressure of the outside atmosphere. This negative pressure can build up due to the drainage and at the same time in the absence of pressure equalization. Thus, in the prior art, water often remains in the interior of the hydrant, which can freeze and thus cause damage. Germs can also form in the residual water.

The object of the present invention is to provide a hose coupling which does not have the above disadvantages.

This object is solved by a hose coupling having the features given in claim 1. Advantageous embodiment variants and a hydrant with a hose coupling are given in further claims.

According to the invention, a hose coupling for a hydrant comprises a ventilation device. The ventilation device comprises a non-return valve, which is accommodated in a receptacle incorporated into an outer flange of the hose coupling.

Thus, a hose coupling is presented having a ventilation device that substantially equalizes or reduces a negative pressure in the interior of the hydrant relative to the pressure of the outside atmosphere. The ventilation device opens a flow path between the outside atmosphere and the interior of the hydrant in a first operating state in which the hydrant is closed. Thus, pressure equalization is possible even if the hose coupling is provided with a backflow preventer. The backflow preventer is bridged in this case. The ventilation device, on the other hand, blocks the flow path between the interior of the hydrant and the outside atmosphere in a second operating state in which the hydrant is open. In this state, the difference between the pressure in the interior of the hydrant and the outside atmosphere exceeds a predetermined threshold value, causing the ventilation device to block the flow path. Thus, advantageously, no water penetrates to the outside via the ventilation device.

In an advantageous embodiment of the hose coupling, the non-return valve comprises a bushing insertable at least in sections into the receptacle and a valve body inserted at least in sections into the bushing. This valve body is adjustable in the axial direction of the bushing. In the closed state of the hydrant, i.e. as long as the hydrant is not under pressure, the valve body is in a position in which a flow path between the interior of the hydrant and the outside atmosphere is permitted. As soon as the hydrant is pressurized, i.e. opened, the valve body is in a position in which the flow path between the inside of the hydrant and the outside atmosphere is shut off.

In an advantageous embodiment of the hose coupling, the valve body comprises a cylinder section, which is inserted at least in sections into the bushing and can be guided therein in the axial direction, and a stop adjoining the cylinder section. The cylinder body can be reliably guided axially and without play within the bushing. The stop can strike against one end of the bushing, thus closing off a flow path or a ventilation path. As soon as the non-return valve opens, the stop strikes with its distal side against the end face of the receptacle.

In this condition, the inside of the hydrant can be ventilated.

In an advantageous embodiment of the hose coupling, the stop projects radially above the cylinder section. The stop can be of mushroom-shaped design. In a further advantageous embodiment of the hose coupling, the stop is adjustable in a section of the receptacle between the bushing and an end surface of the receptacle.

In an advantageous embodiment of the hose coupling, the non-return valve further comprises a ring seal arranged to circumferentially seal the stop from the face of the bushing facing the stop when the non-return valve is in the closed state. The ring seal allows a reliable seal between the bushing or face of the bushing and the facing surface of the stop.

In an advantageous embodiment of the hose coupling, the ring seal is placed in a section around the cylinder section. For example, the cylinder section can be provided with a groove or recess into which the ring seal can be inserted and fixed under tension.

In a further advantageous embodiment of the hose coupling, the end face of the bushing facing the stop is formed with a conically shaped sealing surface. The shape of the sealing surface allows a large-area, reliable seal in cooperation with the ring seal.

In an advantageous embodiment of the hose coupling, the bushing is cylindrical in shape and is provided at least in sections with an external thread, designed to be accommodated by threading in an internal thread correspondingly incorporated into the receptacle. Thus, the non-return valve can be easily screwed into the receptacle via the bushing. The bushing can be provided with slots on the radially outward-facing end face, in which a screwdriver can engage. The installation and maintenance of the entire non-return valve thus prove to be simple and reliable.

In an advantageous embodiment of the hose coupling, the stop is provided with at least one projection on a side facing the end face of the receptacle. In a further advantageous embodiment of the hose coupling, the stop is of convex design on a side facing the end face of the receptacle.

In an advantageous embodiment of the hose coupling, the non-return valve further comprises a resilient return element clamped between the bushing and the valve body, wherein the resilient return element applies a force to the valve body in a direction to open the non-return valve. The wording "applying a force to the valve body in a direction to open the non-return valve" means a direction in which the valve body is forced against the end face of the receptacle, thus opening the flow path between the outside atmosphere and the interior of the hydrant.

In a further advantageous embodiment of the hose coupling, the resilient return element resiliently pretensions the valve body relative to the bushing in such a way that the stop abuts an end surface of the receptacle. As soon as the difference between the pressure in the interior of the hydrant and outside atmosphere exceeds a predetermined threshold, e.g. by opening the hydrant, a force is applied to the cylinder body in the opposite direction, wherein this force exceeds the spring force applied to the cylinder section. This causes the cylinder section to be displaced further into the bushing until the stop abuts directly or indirectly with its facing surface against the end surface of the bushing, thereby closing off the flow path, whereby the ventilation device as a whole closes off the flow path. For example, the cylinder section may include sections having different diameters. A first section with a first diameter can serve as a receptacle for the return element, e.g. a compression spring, by fitting the return element onto this section. A second section with a larger diameter than the first section can serve to reliably guide the valve body axially by contact with the inner surface of the bushing.

In an advantageous embodiment of the hose coupling, the ventilation device further comprises a ventilation path between the receptacle and the interior of the hydrant. In an advantageous embodiment of the hose coupling, the ventilation path comprises a first path extending in the external flange between the receptacle and an external thread of the hose coupling. Further, the ventilation path comprises a second path adjoining the first path. This second path is formed as a recess which is incorporated in the external thread of the hose coupling in the axial direction thereof. The design of this ventilation path proves to be very simple and reliable. Alternatively, the second path can be designed as a longitudinal bore within the material of the outer edge of the hose coupling.

In a further advantageous embodiment of the hose coupling, an opening of the first path is inserted eccentrically into the end surface of the receptacle. The convex shape of the stop in conjunction with the off-center opening of the first path in the end face of the receptacle prevents the opening of the first path from being closed by the stop when the latter abuts against the end surface of the receptacle or is forced by spring force. The stop strikes with its most protruding (axially central) section against the end surface of the receptacle and leaves the opening of the first path free. This allows reliable ventilation while at the same time keeping the design effort low.

In an advantageous embodiment, the hose coupling comprises a backflow preventer. The backflow preventer opens only in the direction of the outflowing water and is otherwise tightly sealed. This prevents water from e.g. a fire hose from being forced back or foreign substances from entering the interior of the hydrant. In the prior art, the backflow preventer prevents ventilation, so that an unfavorably high negative pressure can build up in the interior of the hydrant. The hose coupling according to the invention bridges the backflow preventer by means of the ventilation device. Thus, the pressure in the interior of the hydrant is reliably adjusted to the pressure of the outside atmosphere.

The invention also relates to a hydrant comprising a hose coupling designed to reduce a difference between the pressure in the interior of the hydrant and the pressure of the outside atmosphere. Thus, a hydrant is created which can be reliably drained, preventing possible freezing of residual water in the interior of the hydrant. Likewise, nucleation in the interior of the hydrant due to stagnant residual water can be prevented.

It is expressly pointed out that the above embodiment variants can be combined in any way. Only those combinations of embodiment variants are excluded which would lead to contradictions due to the combination.

In the following, the present invention is further explained with reference to exemplary embodiments shown in the drawings, wherein.

Figure 1:
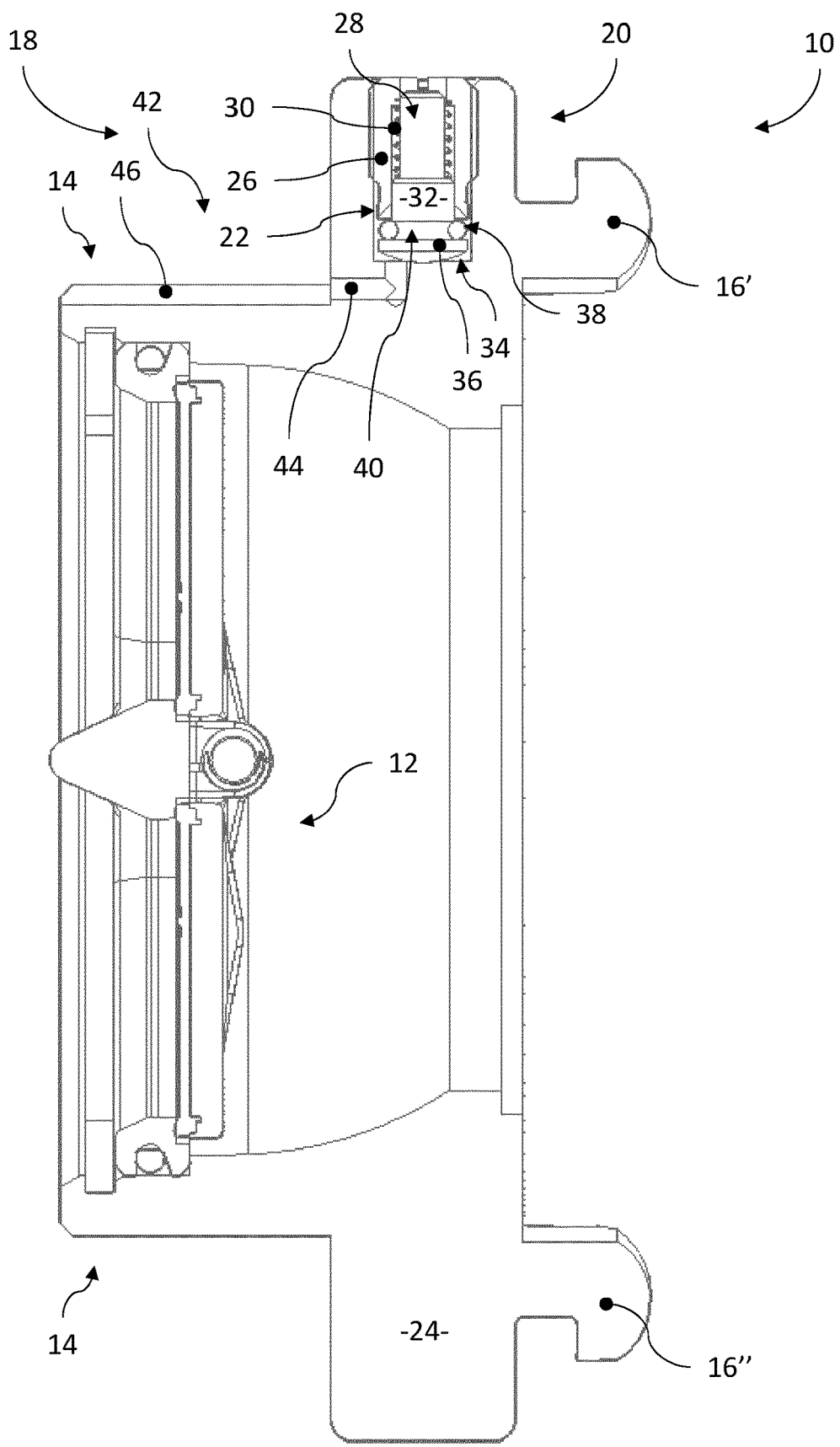
FIG. 1 shows a longitudinal sectional view through a hose coupling with a ventilation device and an installed backflow preventer.
Figure 2:
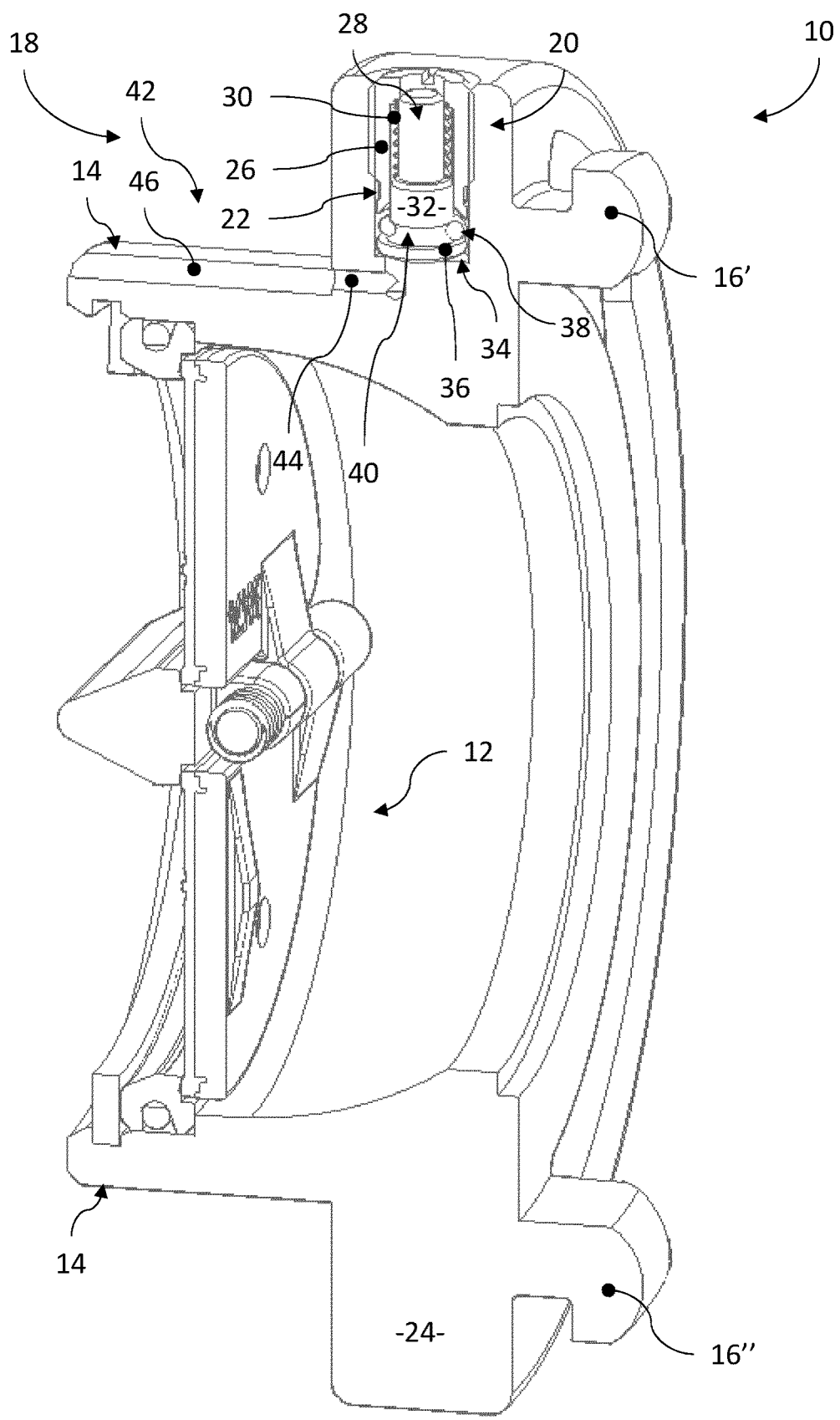
FIG. 2 shows a longitudinal sectional view through a hose coupling with a ventilation device and an installed backflow preventer in a perspective view.
Figure 3:
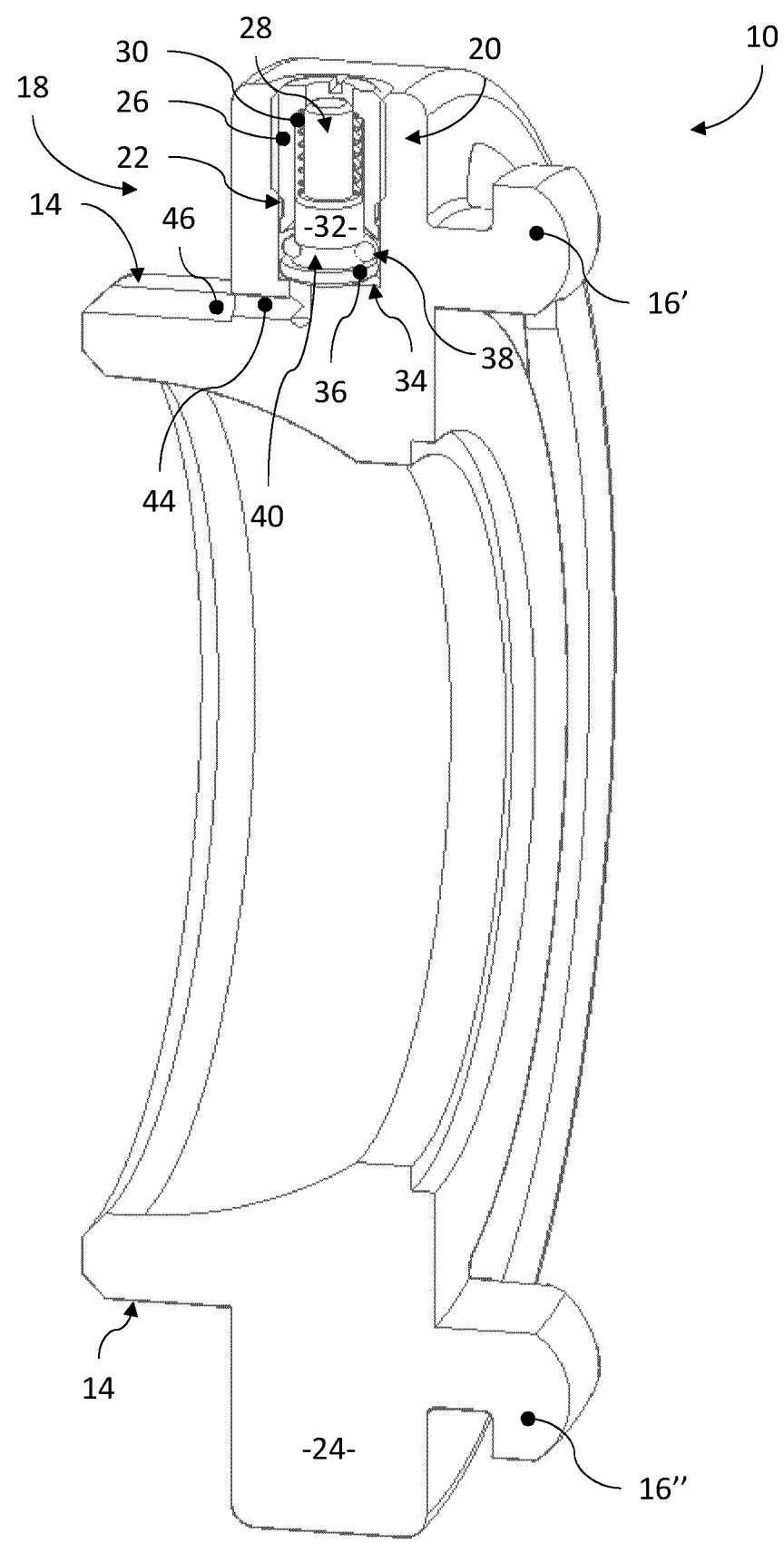
FIG. 3 shows a longitudinal sectional view through a hose coupling with a ventilation device in a perspective view.
Figure 4:
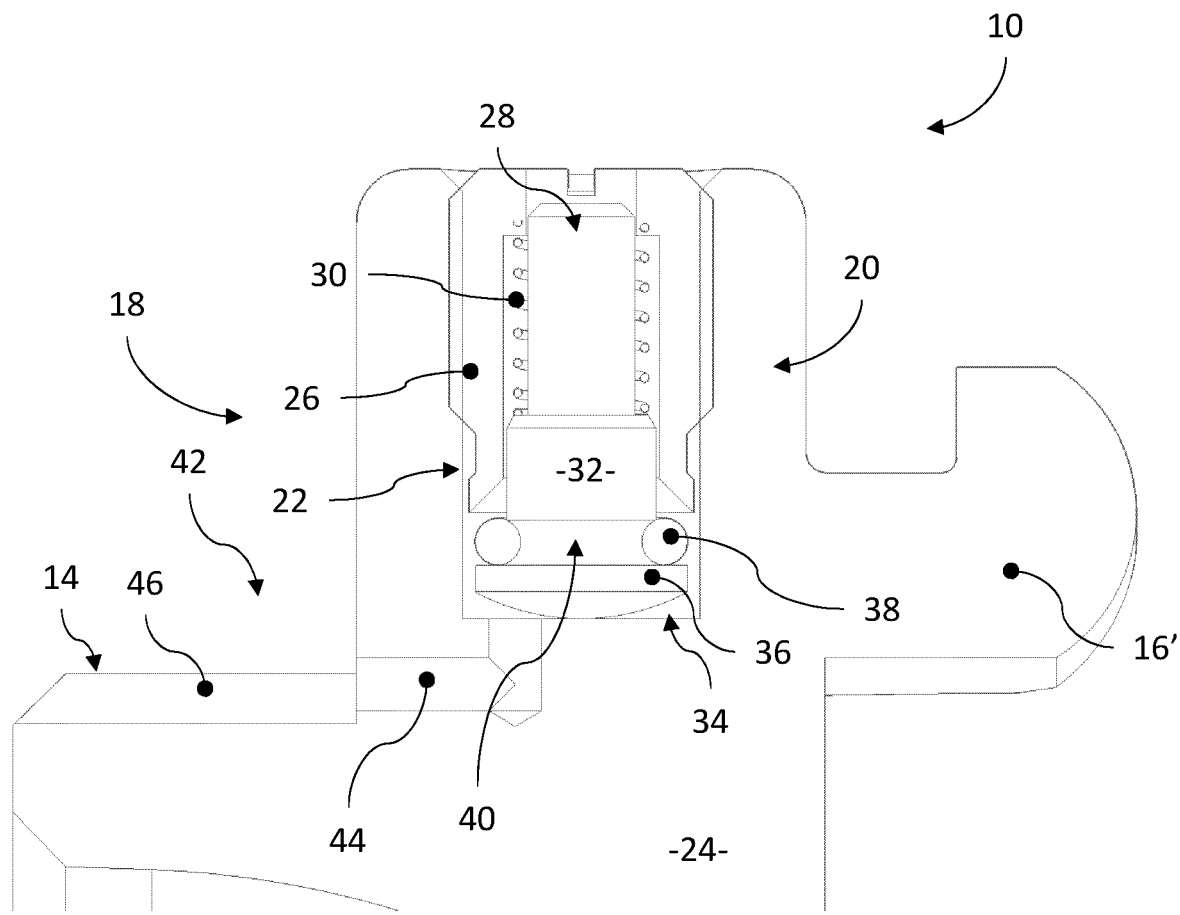
FIG. 4 shows an enlarged representation of the ventilation device in a sectional view.

FIGS. 1-4 each show a longitudinal sectional view through a hose coupling 10 for a hydrant (not shown) in different views. FIGS. 1 and 2 show the hose coupling 10 with a backflow preventer 12 installed, while FIGS. 3 and 4 illustrate the hose coupling 10 in a sectional view without the backflow preventer.

The hose coupling 10 can be screwed into the outlet of a hydrant (not shown) via a threaded section 14. The side of the hose coupling 10 facing the outside can be provided with claws 16', 16" by means of which a bayonet connection can be made with corresponding sections on, for example, a coupling of a fire hose (not shown).

The hose coupling 10 comprises a ventilation device 18, which is designed to substantially equalize a pressure in the interior of the hydrant with respect to the external pressure. The ventilation device 18 comprises a non-return valve 20, which is accommodated in a receptacle 22, which is inserted in an outer flange 24 of the hose coupling 10. The receptacle 22 may be in the form of a blind hole having its axis oriented substantially in the radial direction of the hose coupling 10.

The non-return valve 20 comprises a bushing 26 that is at least partially insertable into the receptacle 22. The bushing 26 may be threaded into the receptacle 22, for example. The bushing 26 receives a valve body 28, which is adjustable in the axial direction of the bushing 26. Between the bushing 26 and the valve body 28, a spring-elastic return element 30 may be clamped, which may be designed as a compression spring. The return element 30 applies a force to the valve body 28, by means of which the valve body 28 is pressed against an end surface 34 of the receptacle 22.

The valve body 28 has a cylinder section 32 which is inserted at least in sections into the bushing 26. Here, the outer circumference of the cylinder section 32 is in abutment with the inner circumference of the bore of the bushing 26, so that the entire valve body 28 can be guided or adjusted in the axial direction of the bushing 26 with substantially no play. The valve body 28 is provided with a stop 36 at an end facing the end surface 34 of the receptacle 22. The stop 36 projects radially or mushroom-shaped in relation to the cylinder section 32. Here, the stop 36 is adjustable in a section of the receptacle 22 between the bushing 26 and the end surface 34 of the receptacle 22. Although not shown, the spring element 30 may be omitted. In the condition shown, the hydrant is not pressurized and air can flow from the outside environment through the ventilation device 18 into the interior of the hydrant. As a result, no negative pressure can build up in the interior of the hydrant and reliable drainage of the hydrant is thus ensured.

As soon as the hydrant is opened, the pressure in the interior of the hydrant increases and exceeds the pressure of the outside atmosphere. As soon as the difference between the pressure in the interior of the hydrant and outside atmosphere exceeds a predetermined threshold, a force is applied to the cylinder body 28 in the opposite direction, with this force exceeding the spring force applied to the cylinder section 28. This displaces the cylinder section 28 a little deeper into the bushing 26 until the stop 36 strikes directly or indirectly with its facing surface against the end surface of the bushing 26, thereby closing off the flow path, whereby the ventilation device 18 as a whole closes off the flow path.

A ring seal 38 can be provided for reliable sealing between the bushing 26, or end face of the bushing 26, and the stop 36. This ring seal 38 can be clamped in a groove 40 formed circumferentially around the cylinder section 32. The ring seal 38 may further be in surface contact with the stop 36. Further, the end face of the bushing 26 facing the stop 36 may be formed with a conically shaped sealing surface. In this embodiment, the ring seal 38 reliably seals the stop 36 circumferentially with respect to the end face of the bushing 26 facing the stop 36. In this position, a flow path through the bushing 26 is blocked or sealed (not shown). Thus, no water reaches the outside of the hydrant via the ventilation device 18.

The ventilation device further comprises a ventilation path 42, wherein the ventilation path 42 comprises a first path 44 extending in the external flange 24 between the receptacle 22 and the external thread 14 of the hose coupling 10, and a second path 46 adjoining the first path 44, the second path 46 being formed as a recess entered in the external thread 14 of the hose coupling 10 in the axial direction thereof. Although not shown, alternatively, the second path, for example, adjoining the first path 44, may be formed as a longitudinal bore within the material of the outer rim of the hose coupling 10.

As previously mentioned, when the hydrant is in the pressure-free condition, a fluid connection opens between the exterior and the interior of the hydrant, allowing ventilation into the interior of the hydrant. This allows outside air to flow through the bore of the bushing 26 along the cylinder body 28 and into the receptacle 22 via the opened annular gap between the bushing 26 and the stop 36. From the receptacle 22, the outside air continues to flow into the interior of the hydrant via the first path 44 and second path 46.

As soon as the difference between the pressure in the interior of the hydrant and the outside atmosphere exceeds a predetermined threshold value, e.g. by opening the hydrant, the non-return valve 20 closes and this connection is blocked. Thus, no water penetrates to the outside via the ventilation device 18.

In summary, the non-return valve 20 assumes two states, namely a first state (closing state) in which the stop 36 abuts and seals against the end face of the bushing 26 facing the stop 36 via the ring seal 38, and a second state (opening state) in which the stop 36 abuts with its opposite side against the end surface 34 of the receptacle 22. The first state here is a state in which a difference between the pressure in the interior of the hydrant and outside pressure exceeds a predetermined threshold. The second state is a state in which there is substantially equal pressure between the pressure in the interior of the hydrant and outside atmosphere, or the difference between the pressure in the interior of the hydrant and outside pressure falls below the predetermined threshold value.

That side of the stop 36 which faces the end surface 34 of the receptacle 22 may be provided with a substantially centrally disposed projection. In the embodiment shown in the figures, the stop is of convex design on the side concerned. In the opened state of the non-return valve 20, the stop 36 thus strikes with its most protruding (axially central) section against the end surface 34 of the receptacle 22. Furthermore, the opening or entrance of the first path 44 is entered eccentrically into the end surface 34 of the receptacle 22. The convex shape of the stop 36 in cooperation with the opening of the first path 44 entered off-center in the end surface 34 of the receptacle 22 prevents this opening from being closed by the stop 36 in the open state of the non-return valve 20, i.e., even if the stop 36 strikes against the end surface 34 of the receptacle 22. In summary, the stop 36 strikes against the end surface 34 of the receptacle 22 with its most protruding (axially central) section, leaving the opening of the first path 44, or its entrance, free. Thus, reliable ventilation of the hydrant is enabled.

As previously described, the hose coupling 10 may be provided with the backflow preventer 12 to prevent, for example, water from, for example, a fire hose from being forced back and possibly foreign matter from entering the interior of the hydrant. The backflow preventer 12 can be bridged by means of the ventilation device 18. Thus, despite the provision of the backflow preventer 12, equalization can be established between the pressure in the interior of the hydrant and the pressure of the outside atmosphere. As soon as the hydrant is pressurized, e.g. by opening the hydrant, the non-return valve 20 closes and water is thus prevented from flowing to the outside via the ventilation device 18.

The invention claimed is:

1. A hose coupling (10) for a hydrant, wherein the hose coupling (10) comprises a ventilation device (18), wherein the ventilation device (18) comprises a non-return valve (20), which is accommodated in a receptacle (22) incorporated into an outer flange (24) of the hose coupling (10),
wherein the ventilation device (18) further comprises a ventilation path (42) between the receptacle (22) and the interior of the hydrant, and
wherein the ventilation path (42) comprises a first path (44) extending in the external flange (24) between the receptacle (22) and an external thread (14) of the hose coupling (10), and a second path (46) adjoining the first path (44), the second path (46) being formed as a recess incorporated in the external thread (14) of the hose coupling (10) in the axial direction thereof or the second path (46) being formed as a longitudinal bore within the material of the outer edge of the hose coupling (10).

2. The hose coupling (10) according to claim 1, wherein the non-return valve (20) comprises a bushing (26) insertable at least in sections into the receptacle (22) and a valve body (28) inserted at least in sections into the bushing (26) and adjustable in the axial direction of the bushing (26).

3. The hose coupling (10) according to claim 2, wherein the valve body (28) comprises a cylinder section (32), which is inserted at least in sections into the bushing (26) and can be guided therein in the axial direction, and a stop (36) adjoining the cylinder section (32).

4. The hose coupling (10) according to claim 3, wherein the stop (36) projects radially above the cylinder section (32).

5. The hose coupling (10) according to claim 3, wherein the stop (36) is adjustable in a section of the receptacle (22) between the bushing (26) and an end surface (34) of the receptacle (22).

6. The hose coupling (10) according to claim 3, wherein the non-return valve (20) further comprises a ring seal (38) arranged to circumferentially seal the stop (36) from the end face of the bushing (26) facing the stop (36) when the non-return valve (20) is in the closed state.

7. The hose coupling (10) according to claim 6, wherein the ring seal (38) is placed in a section around the cylinder portion (32).

8. The hose coupling (10) according to claim 6, wherein the end face of the bushing (26) facing the stop (36) is formed with a conically shaped sealing surface.

9. The hose coupling (10) according to claim 2, wherein the bushing (26) is cylindrical in shape and is provided at least in sections with an external thread, designed to be accommodated by threading in an internal thread correspondingly incorporated into the receptacle (22).

10. The hose coupling (10) according to claim 3, wherein the stop (36) is provided with at least one projection on a side facing the end surface (34) of the receptacle (22).

11. The hose coupling (10) according to claim 3, wherein the stop (36) is of convex design on a side facing the end surface (34) of the receptacle (22).

12. The hose coupling (10) according to claim 1, wherein the non-return valve (20) further comprises a resilient return element (30) clamped between the bushing (26) and the valve body (28), wherein the resilient return element (30) applies a force to the valve body (28) in a direction to open the non-return valve (20).

13. The hose coupling (10) according to claim 12, wherein the resilient return element (30) resiliently pretensions the valve body (28) relative to the bushing (26) in such a way that the stop (36) abuts an end surface (34) of the receptacle (22).

14. The hose coupling (10) according to claim 1, wherein an opening of the first path (44) is inserted eccentrically into the end surface (34) of the receptacle (22).

15. The hose coupling (10) according to claim 1, further comprising a backflow preventer (12).

16. A hydrant, comprising the hose coupling (10) according to claim 1, designed to reduce a difference between the pressure in the interior of the hydrant and the pressure of the outside atmosphere.

* * * * *